United States Patent
Uradnisheck

(10) Patent No.: US 8,349,955 B2
(45) Date of Patent: Jan. 8, 2013

(54) POLY(HYDROXYALKANOIC ACID) PLASTICIZED WITH POLY(TRIMETHYLENE ETHER) GLYCOL

(75) Inventor: Julius Uradnisheck, Glen Mills, PA (US)

(73) Assignee: E I du Pont de Nemours and Company, Wilmington, DE (US)

( * ) Notice: Subject to any disclaimer, the term of this patent is extended or adjusted under 35 U.S.C. 154(b) by 305 days.

(21) Appl. No.: 12/890,032

(22) Filed: Sep. 24, 2010

(65) Prior Publication Data

US 2011/0071258 A1 Mar. 24, 2011

Related U.S. Application Data

(60) Provisional application No. 61/245,471, filed on Sep. 24, 2009.

(51) Int. Cl.
*C08L 67/04* (2006.01)
*C08J 5/18* (2006.01)
*C08J 3/18* (2006.01)
*C08K 5/06* (2006.01)

(52) U.S. Cl. ............ 525/190; 525/450; 528/502 C; 264/210.1; 264/292; 264/331.12; 264/331.18

(58) Field of Classification Search ............ 525/190, 525/450; 264/210.1, 292, 331.12, 331.18; 528/502 C
See application file for complete search history.

(56) References Cited

U.S. PATENT DOCUMENTS

| | | | |
|---|---|---|---|
| 5,908,918 A * | 6/1999 | Chen et al. | ............ 528/354 |
| 6,608,168 B1 | 8/2003 | Ng | |
| 7,323,539 B2 | 1/2008 | Sunkara | |
| 7,381,772 B2 | 6/2008 | Flexman | |
| 2003/0153716 A1 | 8/2003 | Wu | |
| 2004/0198900 A1 | 10/2004 | Madaj | |
| 2005/0069997 A1 | 3/2005 | Adkesson | |
| 2005/0282966 A1 | 12/2005 | Sunkara | |
| 2006/0173133 A1 | 8/2006 | Flexman | |
| 2008/0108845 A1 | 5/2008 | Sunkara | |
| 2009/0131566 A1 | 5/2009 | Uradnisheck | |
| 2009/0281220 A1 | 11/2009 | Fenyvesi | |

FOREIGN PATENT DOCUMENTS

| | | |
|---|---|---|
| JP | 9-316310 A | 12/1997 |
| JP | 2008174619 A | 7/2008 |
| WO | 2008057462 A1 | 5/2005 |
| WO | 2007004906 A1 | 1/2007 |
| WO | 2009137443 A1 | 11/2009 |

OTHER PUBLICATIONS

Database WPI, Week 200941, ThomsonScientific, London, GB; AN 2009-J89559, XP002612046, & JP 2009 120688 A (Toray Ind Inc) Jun. 4, 2009.
Cadogan, D.F. and Howick, C.J., in Kirk-Othmer Encyclopedia of Chemical Technology, John Wiley and Sons, Inc., New York, Dec. 4, 2000. DOI: 10.1002/0471238961.1612011903010415.a01 (Book, not included).
Currie, L.A. "Source Apportionment of Atmospheric Particles", Characterization of Environmental Particles.
Weber, D. et al., "13C-Pattern of Natural Glycerol: Origin and Practical Importance", J. Agric. Food Chem. 1997, 45, 2042-2046.
Hsieh, Yuch-Ping, "Division S-3—Soil Microbiology & Biochemistry", Soil Sci. Soc. Am. J., vol. 56, Mar.-Apr. 1992.
Wypych, GEORGEHandbook of Plasticizers, Chapter 11; ChemTec Publishing 2004 (Book; not included).
Jacobsen, S., Fritz, H.G., Plasticing Polylactide—The Effect of Different Plasticizers on the Mechanical Properties; Polymer Engineering and Science, 39, 1303, 1999.

\* cited by examiner

*Primary Examiner* — Fred M Teskin

(57) ABSTRACT

Toughened, plasticized poly(hydroxyalkanoic acid) polymer compositions comprising poly(trimethylene ether) glycol and ethylene ester copolymers are provided.

22 Claims, No Drawings

POLY(HYDROXYALKANOIC ACID) PLASTICIZED WITH POLY(TRIMETHYLENE ETHER) GLYCOL

This application claims priority to U.S. provisional application Ser. No. 61/245,471, filed Sep. 24, 2009; the entire disclosure of which is incorporated herein by reference.

This invention relates to polymer compositions containing a poly(hydroxyalkanoic acid) and poly(trimethylene ether) glycol.

BACKGROUND

Poly(hydroxyalkanoic acids), also known as polyhydroxyalkanoates (PHA), have gained great attention in the plastics industry because they can be produced from renewable monomers and are biodegradable. Because of these factors, these polymers have been proposed for use in a broad range of applications. Poly(hydroxyalkanoic acids) include polylactide resins (also known as polylactic acid or PLA), which are now available commercially. These resins can be produced from annually renewable resources such as corn, rice or other sugar- or starch-producing plants. In addition, PLA resins are compostable. For these reasons there is significant interest in substituting PLA into applications in which oil-based thermoplastic materials have conventionally been used.

However, physical limitations such as brittleness and slow crystallization may limit the applications of PHA resins. These limitations may prevent easy conversion of PHA into articles that have an acceptable degree of flexibility and toughness for many applications. Extruded amorphous sheeting may also be too brittle for handling in continuous moving equipment without breakage. Manufacturers and customers that use PHA to make a variety of articles are interested in improved processability and cycle times for articles made from this material.

Numerous impact modifiers have been developed in the past to improve the toughness of poly(hydroxyalkanoic acids). For example, Japanese Patent 9316310 discloses a poly(lactic acid) resin composition comprising a modified olefin compound as an impact modifier. US Patent Application Publication 2006/0173133 discloses a toughened poly(hydroxyalkanoic acid) composition wherein an ethylene ester copolymer (e.g., a terpolymer having copolymerized units of ethylene, butyl acrylate and glycidyl methacrylate (EBAGMA)) is used as an impact modifier.

Plasticizers are substances which, when added to another material, make that material softer and more flexible. Generally, this means that there is an increase in flexibility and workability, brought about by a decrease in the glass-transition temperature, Tg, of the composition.

Common plasticizers include phthalates such as diisobutyl phthalate, dibutyl phthalate, and benzylbutyl phthalate; adipates, including di-2-ethylhexyl adipate; trimellitates, including tris-2-ethylhexyl trimellitate; and phosphates, including tri-e-ethylhexyl phosphate. However, the use of some of these plasticizers has been curtailed due to potential toxicity issues. Polyester plasticizers have also been used, generally based on condensation products of propanediol or butanediol with adipic acid or phthalic anhydride, and therefore may exhibit very high viscosities which subsequently cause processing problems in blending with other polymers. Plasticizers are disclosed, for example, in D. F. Cadogan and C. J. Howick in Kirk-Othmer Encyclopedia of Chemical Technology, John Wiley and Sons, Inc., New York, Dec. 4, 2000, DOI: 10.1002/0471238961.1612011903010415.a01 and in the Handbook of Plasticizers; Edited by: Wypych, George; 2004 ChemTec Publishing; Chapter 11.

There is a desire to provide biodegradable plasticizers or plasticizers from renewable source, for natural polymers having improved or equivalent material properties to those provided by traditional, non-renewably sourced materials.

US Patent Application Publication 2009/0131566 discloses compositions comprising a PHA such as poly(lactic acid) modified with plasticizer and optionally a nucleator, an impact modifier, or both.

It is known in the art that each plasticizer has different behavior and the same plasticizer may behave differently with different polymers. Thus the type and concentration of plasticizer can be selected to improve the performance of a specific polymer. For example the behavior of polytrimethylene ether glycol when added to poly(lactic acid) polymer is different from the behavior of polyethylene glycol when added to PLA. Such differences are disclosed, for example, in *Polymer Engineering and Science*, 39, 1303, 1999.

SUMMARY OF THE INVENTION

This invention provides a plasticized polymer composition, comprising, consisting essentially of, consisting of, or prepared from, a blend of a poly(hydroxyalkanoic acid), an ethylene ester copolymer, and poly(trimethylene ether) glycol wherein, based on the total weight of the composition;

the poly(hydroxyalkanoic acid) base polymer is present in the composition from about 50 to 99.8%;

the ethylene ester copolymer is present in the composition from about 0.1 to about 40%, the ethylene ester copolymer comprises (a) about 30 to about 99.5 weight % of copolymerized units of ethylene; (b) 0 to about 25 weight % of copolymerized units of at least one ester of the formula $CH_2=C(R^1)CO_2R^2$, $R^1$ is hydrogen or an alkyl group having 1-6 carbon atoms, and $R^2$ is a glycidyl group, based on the total weight of the ethylene ester copolymer; and (c) 0 to about 70 weight % of copolymerized units of at least one ester of the formula $CH_2=C(R^3)CO_2R^4$, $R^3$ is hydrogen or an alkyl group having 1 to 8 carbon atoms, and $R^4$ is an alkyl group having 1 to 8 carbon atoms; provided that the amounts of (b) and (c) in the copolymer are not both 0; and the poly(trimethylene ether) glycol is present in the composition from about 0.1 to about 40% and has a hydroxyl number from 20 to 840.

The invention also provides shaped articles comprising, consisting essentially of, consisting of, or prepared from the composition described above.

A process for producing a plasticized polymer, comprising, consisting essentially of, or consisting of:

physically blending (i) about 50 to 99.9 weight % of dried poly(hydroxyalkanoic acid) as described above, (ii) about 0.1 to about 40 weight % of an ethylene ester copolymer as described above, and (iii) about 0.1 to about 50 weight % of poly(trimethylene ether) glycol as described above to produce a blend;

melt processing the blend at a temperature 20 to 40° C. higher than the melt temperature of the poly(hydroxyalkanoic acid) to form a mixture; and cooling the mixture to produce a composition; and optionally grinding the mixture.

DETAILED DESCRIPTION

The composition disclosed above can be a toughened composition as compared to the poly(hydroxyalkanoic acid)

(PHA), which is also referred to as "base polymer", from which the composition is produced. Plasticizers and ethylene copolymer can be combined, or added to, the PHA. Examples of the PHA include polylactic acid (PLA) and poly(3-hydroxy butyrate-co-valerate).

When poly(trimethylene ether) glycol is added as a plasticizer to PLA, it can provide a variety of benefits including reduction in stiffness and thereby improving flexibility. This effect has been observed with polyethylene glycol with a number average molecular weight 1500 as disclosed in the reference cited above. In contrast, when poly(trimethylene ether) glycol is added in quantities up to 5 weight % to PLA, it improves the flexibility of the polymer without affecting its stiffness and melt temperature.

When used without additional modifiers, as the amount of poly(trimethylene ether) glycol is increased from 2.5 to 10 weight %, the glass transition temperature of PLA decreases progressively but the rate and the degree of crystallinity does not increase proportionately with the amount of glycol. The viscosity of PLA also decreases with an increase in amount of poly(trimethylene ether) glycol in the polymer. Since poly(trimethylene ether) glycol reduces the melt viscosity of PLA, it is possible to melt process the blend compositions at relatively lower temperatures than neat PLA and thereby minimize PLA thermal degradation. The physical appearance and transparency of the PLA is not affected by the presence of poly(trimethylene ether) glycol, indicating good compatibility. Poly(trimethylene ether) glycol is non-volatile, so it remains in the PLA throughout melt processing needed to produce shaped articles.

Poly(trimethylene ether) glycol when present in small quantities has been observed to improve the flexibility of the PLA and increases elongation to break while retaining most of the other mechanical properties. No significant changes in hardness, storage, tensile and flexural moduli, tear resistance and impact strength have been observed.

Poly(hydroxyalkanoic acid) (PHA) such as polylactic acid (PLA) resins can be used for transparent thermoformed packaging articles such as cups, trays, lids, and clam shell packages. In thermoforming, the resin is first extruded into an amorphous sheet, the sheet is then heated to above the glass transition temperature (Tg) and below its melting point, and stretched by vacuum or pressure forming using a mold into finished articles. The transparency benefits of articles made from PHA are counter-balanced somewhat by dimensional instability of those articles with heated contents, such as warm beverages or during hot-fill operations, or even during hot ambient conditions.

PLA grades used for thermoforming may have a Tg of around 55° C., but articles of such PLA that are thermoformed into molds cooler than the Tg have poor dimensional stability when heated above the 55° C. because they have developed little or no crystallinity during their rapid cooling down in the thermoforming mold. Packaging articles of PLA may experience temperatures above 55° C. during hot-fill applications, transport or storage so it is desirable to find ways to give PLA articles better mechanical stability under such conditions. A thermoformed or stretched article may shrink in a few seconds by more than 5% (sometimes 50%) when heated above the Tg. The tendency for shrinkage may be especially high (to 50%) in those parts of a thermoformed article that experiences an amount of orientation between about 25% (final length or area is 25% greater than the pre-formed length or area) and about 100%. The top and base of thermoformed articles often have this range of orientation and therefore experience high deformation when the article is heated above its Tg.

The shrinkage force can be due to the presence of stretched PLA molecules not crystallized but amorphous and frozen in place by rapid cooling of the article, termed "amorphous orientation". When the temperature rises above the glass transition temperature (Tg) these molecules relax in a few seconds and induce or cause shrinkage or deformation of the article. Therefore, thermoformed articles made of PHAs such as PLA require high crystallinity after thermoforming to provide dimensional stability when reheated. It is beneficial for dimensional stability to thermoform a PLA having fast cold crystallization properties. The term "cold crystallization" refers to a process in which an amorphous composition crystallizes when heated between its glass transition temperature and its melting point. As used herein, "faster cold crystallization" indicates both a lower cold crystallization initiation temperature and more crystallinity for a modified PHA composition compared to the unmodified PHA resin.

A lower cold crystallization temperature may be useful. Cold crystallization generates crystallinity in PHA during the process of its being stretched during the thermoforming process and before the formed sheet is cooled below Tg by contact with the mold. A lower cold crystallization temperature may in effect start the crystallization process sooner and thereby give the sheet more time to crystallize before it is quenched by the mold. Furthermore if the cold crystallization temperature can be lowered below 100° C. steam-heated molds could be used to induce additional crystallinity in the formed article. Increased amounts of crystallinity in the thermoformed article provide higher temperature resistance.

Particularly fast crystallizing PLA polymers include those with low molecular weight (such as below 10,000 g/mole) or those with low D-lactide (meso-lactide) content. However, most PLA resins do not readily crystallize when the amorphous sheet is formed into articles, especially at the top or rim and base of the article where the orientation is within a range. Plasticizers as described above can speed nucleation but they also decrease the Tg of the composition, which negatively affects the dimensional stability of thermoformed article because the temperature at which deformation occurs is lowered.

Another method for obtaining fast crystallization of PLA is to add nucleators, which are generally considered to act as crystal growth initiation sites; that is to say, they overcome the thermodynamic hurdle associated with forming the very first volume or seed of crystalline substance by acting as the seed itself. An example of such a common nucleator for PLA is finely ground talcite which may be advantageous for those applications of PLA not requiring transparency and toughness.

Other nucleators that provide improved crystallization of PHA compositions are known in the prior art (see U.S. Pat. Nos. 6,114,495; 6,417,294 and 7,301,000 and US Patent Application Publications 2008/0306185 and 2009/0131566). PHAs modified with a mixture of an amide nucleator such as behenamide and impact modifiers such as EBAGMA are also known (US Patent Application Publication 2009/0069509) and also exhibit greater crystallinity.

As discussed above, it is also known to add ethylene ester copolymers such as ethylene/butyl acrylate/glycidyl methacrylate terpolymers (EBAGMA) to PHA compositions as impact modifiers to improve the toughness (reduce brittleness) of the PHA polymer when in the form of a finished shaped article.

Surprisingly, a combination of poly(trimethylene ether) glycols and ethylene ester copolymers as described herein added to a PHA composition provides faster cold crystallization (both a lower cold crystallization initiation temperature and more crystallinity) for the modified PHA composition than exhibited by the unmodified PHA resin. As discussed above, these factors are useful in preparing shaped articles such as thermoformed articles.

The combination also provides plasticized PHA compositions with glass transition temperatures (Tg) that are higher than expected based on the amount of poly(trimethylene ether) glycol added, allowing production of shaped articles with better resistance to distortion, such as shrinkage, on heating. The combination also allows for improved clarity and toughness.

Poly(hydroxyalkanoic Acid) Polymers

The poly(hydroxyalkanoic acids) or poly(hydroxyalkanoic acid) polymers suitable for use in the compositions may be prepared by polymerization of hydroxyalkanoic acids having 2 to 7 carbon atoms. For example, the poly(hydroxyalkanoic acids) may comprise polymerized units of 6-hydroxyhexanoic acid (also known as polycaprolactone (PCL)), 3-hydroxyhexanoic acid, 4-hydroxyhexanoic acid, or 3-hydroxyheptanoic acid. The poly(hydroxyalkanoic acids) are preferably derived from the polymerization of hydroxyalkanoic acids (or esters thereof) having 2 to 5 carbon atoms, such as polymerized units of glycolic acid, lactic acid, 3-hydroxypropionic acid, 2-hydroxybutyric acid, 3-hydroxybutyric acid, 4-hydroxybutyric acid, 3-hydroxyvaleric acid, 4-hydroxyvaleric acid, or 5-hydroxyvaleric acid.

The poly(hydroxyalkanoic acids) useful as components of the compositions may be homopolymers or copolymers comprising at least one comonomer derived from a hydroxyalkanoic acid or a derivative thereof. By derivative is meant a hydroxyalkanoate or a cyclic dimer (e.g., a lactide dimer) derived from the reaction between two hydroxyalkanoic acids. Blends of such polymers are also useful.

For example, the poly(hydroxyalkanoic acid) polymer may be a blend of copolymers of such as poly(hydroxybutyric acid-hydroxyvaleric acid) copolymers and poly(glycolic acid-lactic acid) copolymers. Such copolymers can be prepared by catalyzed copolymerization of a poly(hydroxyalkanoic acid) or derivative with one or more comonomers derived from cyclic esters and/or dimeric cyclic esters. Such esters may include glycolide (1,4-dioxane-2,5-dione); the dimeric cyclic ester of glycolic acid; lactide (3,6-dimethyl-1,4-dioxane-2,5-dione); α,α-dimethyl-β-propiolactone; the cyclic ester of 2,2-dimethyl-3-hydroxy-propanoic acid; β-butyrolactone; the cyclic ester of 3-hydroxybutyric acid; δ-valerolactone; the cyclic ester of 5-hydroxypentanoic acid; ε-caprolactone; the cyclic ester of 6-hydroxyhexanoic acid; the lactone of the methyl substituted derivatives of 6-hydroxyhexanoic acid (such as 2-methyl-6-hydroxyhexanoic acid, 3-methyl-6-hydroxyhexanoic acid, 4-methyl-6-hydroxyhexanoic acid, 3,3,5-trimethyl-6-hydroxyhexanoic acid, etc.); the cyclic ester of 12-hydroxy-dodecanoic acid and 2-p-dioxanone; and the cyclic ester of 2-(2-hydroxyethyl)-glycolic acid.

The poly(hydroxyalkanoic acid) polymers may also be copolymers of one or more hydroxyalkanoic acid monomers or derivatives with other comonomers, such as aliphatic and aromatic diacid and diol monomers (e.g., succinic acid, adipic acid, terephthalic acid, ethylene glycol, 1,3-propanediol, and 1,4-butanediol).

Preferably, the poly(hydroxyalkanoic acid) is selected from poly(glycolic acid), poly(lactic acid) (PLA), poly(hydroxybutyric acid), poly(hydroxybutyric acid-hydroxyvaleric acid) copolymer, poly(glycolic acid-lactic acid) copolymer, and combinations of two or more thereof. More preferably, the poly(hydroxyalkanoic acid) is a poly(lactic acid), including PLA having a number average molecular weight ($M_n$) of about 3,000 to about 1,000,000. Preferably $M_n$ is about 10,000 to about 700,000, more preferably about 20,000 to about 600,000.

The poly(lactic acid) may be a homopolymer or a copolymer containing at least about 50 mol %, or at least about 70 mol %, or at least about 90 mol % of copolymerized units derived from lactic acid or derivatives thereof. The poly(lactic acid) homopolymers or copolymers can be prepared from the two optical monomers D-lactic acid and L-lactic acid, or a mixture thereof (including a racemic mixture thereof). Either D- or L-lactic acid can be produced in synthetic processes, whereas fermentation processes usually (but not always) tend to favor production of the L enantiomer. The poly(lactic acid) copolymer may be a random copolymer or a block copolymer or a stereo block copolymer or a stereo complex between optical blocks. For example, the poly(lactic acid) copolymer may be the stereo complex of about 50% of poly(D-lactic acid) and about 50% of poly(L-lactic acid). Alternatively, the poly(lactic acid) copolymer may be a copolymer in which the average enantiomer ratios may be from 70:30 to 97:3 or greater, such as from 80:20 to 90:10 or 95:3 or greater. Blends of copolymers having different enantiomer ratios may also be used to provide a resin with an enantiomer ratio in a desired range. Of note are compositions (either copolymers or blends) wherein one enantiomer constitutes 90-99.5% of the polymerized lactic acid units and the other enantiomer constitutes from 0.5 to 10% of the polymerized lactic acid units.

The poly(hydroxyalkanoic acid) may be prepared by any suitable process. For example, the poly(hydroxyalkanoic acid) may be prepared by a) a direct dehydration-polycondensation process which involves the dehydration and condensation of the hydroxyalkanoic acid(s) in the presence of an organic solvent and catalyst (see e.g., U.S. Pat. Nos. 5,310,865 and 5,401,796); b) an indirect polymerization process which involves the dehydration of the hydroxyalkanoic acid (s) into cyclic dimers thereof and the ring-opening polymerization of the cyclic dimers (see e.g., U.S. Pat. No. 2,703,316); or c) the reaction of two or more homopolymers of poly(hydroxyalkanoic acid) in the presence of an organic solvent (see e.g., European Patent Publication 712880A2). A preferred lactide is produced by polymerizing lactic acid to form a prepolymer, and then depolymerizing the prepolymer and simultaneously distilling off the lactide that is generated, described in U.S. Pat. No. 5,274,073.

Poly(hydroxyalkanoic acid) polymers may also be synthesized in vivo by living organisms or isolated from plant matter. Numerous microorganisms have the ability to accumulate intracellular reserves of poly(hydroxyalkanoic acid) polymers. For example, the copolymer of poly(3-hydroxybutyrate-co-3-hydroxyvalerate) (PHB/V) has been produced by fermentation by the bacterium *Ralstonia eutropha*. Fermentation and recovery processes for other types of poly(hydroxyalkanoic acid) polymers have also been developed using a range of bacteria including *Azotobacter, Alcaligenes latus, Comamonas testosterone* and genetically engineered *E. coli* and *Klebsiella*. U.S. Pat. No. 6,323,010 discloses a number of poly(hydroxyalkanoic acid) polymers prepared from genetically modified organisms.

Poly(trimethylene ether) Glycol (PO3G)

Poly(trimethylene ether) glycols as used herein are oligomeric or polymeric ether glycols that are liquids at room temperature and have melting temperatures below 20° C. and glass transition temperature below −70° C.

Poly(trimethylene ether) glycol is preferably prepared by polycondensation of monomers comprising 1,3-propanediol, thus resulting in polymers or copolymers containing —(CH$_2$CH$_2$CH$_2$O)— linkages (e.g, trimethylene ether repeating units). At least 50% of the repeating units in the polymer or copolymers are trimethylene ether units. More preferably from about 75% to 100%, still more preferably from about 90% to 100%, and even more preferably from about 99% to 100%, of the repeating units are trimethylene ether units.

In addition to the trimethylene ether units, lesser amounts of other units, such as other polyalkylene ether repeating units, may be present. In the context of this disclosure, the term "poly(trimethylene ether) glycol" encompasses PO3G made from 1,3-propanediol, as well as those oligomers and polymers (including those described below) containing up to about 50% by weight of comonomers. Comonomer polyols that are suitable for use in the processes and compositions disclosed herein include aliphatic diols, for example, ethylene glycol, 1,6-hexanediol, 1,7-heptanediol, 1,8-octanediol, 1,9-nonanediol, 1,10-decanediol, 1,12-dodecanediol, 3,3,4,4,5,5-hexafluoro-1,5-pentanediol, 2,2,3,3,4,4,5,5-octafluoro-1,6-hexanediol, and 3,3,4,4,5,5,6,6,7,7,8,8,9,9,10,10-hexadecafluoro-1,12-dodecanediol; cycloaliphatic diols, for example, 1,4-cyclohexanediol, 1,4-cyclohexanedimethanol and isosorbide; and polyhydroxy compounds, for example, glycerol, trimethylolpropane, and pentaerythritol. A preferred group of comonomer diols is selected from the group consisting of ethylene glycol, 2-methyl-1,3-propanediol, 2,2-dimethyl-1,3-propanediol, 2,2-diethyl-1,3-propanediol, 2-ethyl-2-(hydroxymethyl)-1,3-propanediol, $C_6$ to $C_{10}$ diols (such as 1,6-hexanediol, 1,8-octanediol and 1,10-decanediol) and isosorbide, and mixtures thereof. A particularly preferred diol other than 1,3-propanediol is ethylene glycol, and $C_6$ to $C_{10}$ diols can be particularly useful as well.

A preferred copolyether glycol is poly(trimethylene-ethylene ether) glycol. Preferred poly(trimethylene-ethylene ether) glycols are prepared by acid catalyzed polycondensation of from 50 to about 99 mole % (preferably from about 60 to about 98 mole %, and more preferably from about 70 to about 98 mole %) 1,3-propanediol and 50 to about 1 mole % (preferably from about 40 to about 2 mole %, and more preferably from about 30 to about 2 mole %) ethylene glycol.

The hydroxyl groups of the poly(trimethylene ether) glycol or poly(trimethylene-ethylene ether) glycol may also be esterified to provide polyetherglycol esters, which are also suitable for use as described herein.

The 1,3-propanediol employed for preparing the poly(trimethylene ether) glycols may be obtained by any of the various well known chemical routes or by biochemical transformation routes. Preferred routes are described in, for example, US2005/0069997A1.

Preferably, the 1,3-propanediol is obtained biochemically from a renewable source ("biologically-derived" 1,3-propanediol), as described in U.S. Patent Application 61/175,522.

A preferred poly(trimethylene ether) glycol for use as described herein has a Mn (number average molecular weight) of at least about 134, preferably from about 250 to about 5000, more preferably from about 650 to about 3000. The hydroxyl number of polytrimethylene ether glycol is in the range of 20 to 840.

Poly(trimethylene ether) glycols preferred for use in the processes and compositions disclosed herein are typically polydisperse, having a polydispersity (i.e. Mw/Mn) of from about 1.2 to about 2.2, more preferably from about 1.2 to about 2.2, and still more preferably from about 1.5 to about 2.1.

The poly(trimethylene ether) glycols may be blended with other known ester plasticizers including but not limited to synthetic and natural esters. Natural esters include vegetable based triglyceride oils such as soybean, sunflower, rapeseed, palm, canola, and castor oils. Preferred vegetable oils include castor oil, high oleic soybean oil and high oleic sunflower oil.

The poly(trimethylene ether) glycol is added to the base PHA polymer in an effective amount. As used herein, "effective amount" refers to the amount of plasticizer that provides improved physical properties to the base polymer (including increased flexibility, workability) so that the plasticized base polymer exhibits improved performance in the desired end use. The poly(trimethylene ether) glycol is added to the base polymer at about 0.1 to 40% by weight or less, preferably at about 1 to 40% by weight and more preferably at about 2 to 30% by weight.

Ethylene Ester Copolymers

The ethylene ester copolymers useful as components of the compositions are polymers prepared by polymerization of ethylene and one or more ester comonomer(s) wherein the ethylene ester copolymer comprises (a) about 30 to about 95 weight % of copolymerized units of ethylene, (b) 0 to about 25 weight % of copolymerized units of at least one ester of the formula $CH_2=C(R^1)CO_2R^2$, wherein $R^1$ is hydrogen or an alkyl group having 1-6 carbon atoms, and $R^2$ is a glycidyl group, based on the total weight of the ethylene ester copolymer and (c) 0 to about 70 weight % of copolymerized units of at least one ester of the formula $CH_2=C(R^3)CO_2R^4$, wherein $R^3$ is hydrogen or an alkyl group having 1 to 8 carbon atoms and $R^4$ is an alkyl group having 1 to 8 carbon atoms; provided that the amounts of (b) and (c) in the copolymer are not both 0.

The ester comonomers used in the copolymer may include esters of unsaturated acids having the formula (b) $CH_2=C(R^1)CO_2R^2$, where $R^1$ is hydrogen or an alkyl group having 1-6 carbon atoms and $R^2$ is a glycidyl group. When present in the copolymer, copolymerized units of (b) may be present in about 0.5 to about 25 weight %. For example, ester comonomer (b) can be glycidyl methacrylate.

The ester comonomers used in the copolymer also may include esters of unsaturated acids having the formula (c) $CH_2=C(R^3)CO_2R^4$, where $R^3$ is hydrogen or an alkyl group having 1-8 carbon atoms and $R^4$ is an alkyl group having 1 to 8 carbon atoms, preferably 1 to 4 carbon atoms. For example, ester comonomer (c) can be methyl, ethyl, or butyl methacrylate. Other useful ester comonomers include one or more of n-butyl acrylate, tert-butyl acrylate, iso-butyl acrylate, and sec-butyl acrylate. When present in the copolymer, copolymerized units of (b) may be present in about 0.5 to about 70 weight %.

The ethylene ester copolymer may comprise about 30 to about 99.5 weight %, about 30 to about 90 weight %, about 40 to about 94 weight %, about 40 to about 90 weight %, or about 50 to about 80 weight %, of copolymerized units of ethylene based on the total weight of the ethylene ester copolymer. The ethylene ester copolymer may comprise about 0.5 to about 25 weight %, about 2 to about 20 weight %, or about 3 to about 17 weight %, of copolymerized units of an ester comonomer of formula (b), based on the total weight of the ethylene ester copolymer. The ethylene ester copolymer may also comprise about 0.5 to about 70 weight %, preferably about 3 to about 70 weight %, more preferably about 3 to about 40 weight %, even more preferably about 15 to about 35 weight %, and most preferably about 20 to about 35 weight %, of copolymerized units of an ester comonomer of formula (c) based on the total weight of the ethylene ester copolymer.

In certain embodiments, the amount of ester comonomer of formula (c) is 0, and it may not be present in the copolymer (that is, the amount of copolymerized units of the ester of formula $CH_2=C(R^3)CO_2R^4$ is 0 weight %) and the ethylene ester copolymers are derived from the copolymerization of ethylene and an ester comonomer of formula (b).

In other embodiments, the amount of ester comonomer of formula (b) is 0, and it may not be present in the copolymer (that is, the amount of copolymerized units of the ester of formula $CH_2=C(R^1)CO_2R^2$ is 0 weight %) and the ethylene ester copolymers are derived from the copolymerization of ethylene and an ester comonomer of formula (c).

In still other embodiments, copolymerized units of both ester comonomers of formula (b) and of formula (c) may be present in the copolymer and the ethylene ester copolymers are derived from the copolymerization of ethylene, an ester comonomer of formula (b) and an ester comonomer of formula (c). Specific examples of the ethylene ester copolymers useful as components of the compositions of the invention include dipolymers produced by the copolymerization of ethylene and glycidyl methacrylate which are referred to as EGMA, dipolymers produced by the copolymerization of ethylene and butyl acrylate (EBA) and terpolymers produced by the copolymerization of ethylene, butyl acrylate, and glycidyl methacrylate (EBAGMA).

Additional comonomers may be present as copolymerized units in the ethylene copolymers. That is, the copolymers may be dipolymers, terpolymers or higher order copolymers. For example, the ethylene ester copolymers may additionally comprise other comonomers such as carbon monoxide. When present, copolymerized units of carbon monoxide generally may comprise up to about 20 weight %, or about 3 to about 15 weight %, of the total weight of the ethylene ester copolymer. A copolymer of note is a terpolymer comprising copolymerized units of ethylene, butyl acrylate, and carbon monoxide (EBACO).

The ethylene ester copolymers may be prepared by any suitable process. Preferably, the ethylene ester copolymer is prepared by contacting ethylene and the ester comonomer(s) under conditions suitable for copolymerization to provide a polymer chain in which units of ethylene are copolymerized with units of the ester(s) so that the polymer chain includes atoms that were originally in the ester comonomer(s). In particular, the ethylene ester copolymers may be prepared by polymerization of the foregoing monomers in the presence of a free-radical polymerization initiator at elevated temperatures (e.g, about 100° C. to about 270° C. or about 130° C. to about 230° C.) and elevated pressures (e.g., at least about 70 MPa or about 140 to about 350 MPa) and the polymerization may be carried out by a) a batch process in a conventional autoclave, or b) a continuous process in a series of autoclaves or a multi-zoned autoclave or a tubular reactor (see, e.g., U.S. Pat. Nos. 3,350,372; 3,756,996; 5,532,066; 5,543,233; and 5,571,878). The ethylene ester copolymers may be homogeneous or not. For example, the ethylene ester copolymers may not be homogeneous in terms of concentration of monomer units along the polymer chain due to imperfect mixing during polymerization or variable monomer concentrations during the course of the polymerization.

Alternatively the ethylene ester copolymer may be a glycidyl methacrylate grafted ethylene copolymer or polyolefin, wherein an existing ethylene copolymer such as ethylene/methyl acrylate copolymer or a polyolefin such as polyethylene is reacted with glycidyl methacrylate to provide a copolymer with units derived from glycidyl methacrylate that are pendant from the polymer chain.

The ethylene ester copolymer is added to the base PHA polymer in an effective amount. As used herein, "effective amount" refers to the amount of ethylene ester copolymer that provides improved physical properties to the base polymer (including increased toughness) so that the base polymer exhibits improved performance in the desired end use. The ethylene ester copolymer is added to the base polymer at about 0.1 to 40% by weight or less, preferably at about 1 to 40% by weight and more preferably at about 2 to 30% by weight.

Poly(lactic acid)/poly(trimethylene ether) Glycol/Ethylene Copolymer Blends

The PO3G plasticizer and ethylene ester copolymer can be added to the base PHA polymer using any convenient method known to the skilled artisan. The plasticizer and ethylene ester copolymer may be blended with the base polymer in a mixer (such as an extruder), and then mixed at a temperature 20 to 40° C. higher than the melt temperature of the base polymer, for example between 150 and 250° C., although the preferred mixing temperature is dependent on the melt temperature of the base polymer. After the base polymer, plasticizer and ethylene ester copolymer are mixed (for example, 15 minutes to 60 minutes, dependent on the materials mixed) the mixture is cooled. While any cooling method can be used, liquid nitrogen may be used so that the modified base polymer mixture is cooled to a temperature where it can be easily (optionally) ground into particles if desired. Any grinding procedure can be used, and the material may be ground to particle sizes of about 0.1 to 10 mm, or any size that may allow further processing. Once the material is prepared and optionally ground, it may be dried at a slightly elevated temperature (such as about 80° C.) under an inert atmosphere (generally nitrogen gas). The dried, optionally ground material can then be further processed to form the desired product. The processing can take place in an extruder, or press mold, for example, forming a product by extrusion molding or press molding.

Also, solvent or aqueous ("wet") slurry processes can be used to add the plasticizer to the polymer. Additionally, the plasticizers can be added as liquids by means of a displacement pump, or any convenient method, directly to the extruder barrel. Combinations of these processes can also be used.

In one embodiment, PLA can be combined with poly(trimethylene ether) glycol and an ethylene copolymer as described above. All components are dried separately before combining. It is preferred that the water content of each of the components is less than 500 ppm. The dried solid PLA is then compounded with a desired amount of poly(trimethylene ether) glycol and a desired amount of ethylene ester copolymer and is melt mixed and extruded so that the resulting blended composition has a poly(trimethylene ether) glycol content in the range of about 0.1 to about 40% by weight and an ethylene copolymer content in the range of about 0.1 to about 40% by weight, although lower amounts such as about 1 to about 10% by weight of each can give desirable results such as, for example, lower crystallization temperature, improved flexibility and improved impact resistance.

Preferably, the ethylene ester and the poly(trimethylene ether) glycol are added simultaneously to the PHA base polymer. As used herein, simultaneously means that all components are added at the same time. For a batch process, simultaneously means that all the components may be added to the batch blender over a short period of time, such as up to about 15 seconds, and then mixed. For a continuous process, such as in an screw extruder, simultaneously means that all components are added to the mixing operation at feed rates such that the desired ratio of ethylene ester, poly(trimethylene ether) glycol and base polymer is present throughout the mixing portion of the extruder barrel.

Alternatively, masterbatches containing two components of the polymer composition may be prepared and then blended with the third component. For example, a masterbatch containing a blend of EBAGMA and up to 50 weight % of PO3G could be prepared and subsequently blended with PLA to prepare the final blended composition. Another example is a poly(lactic acid) masterbatch comprising up to 40% by weight of poly(trimethylene ether) glycol based on the total combined weight of the PLA and poly(trimethylene ether) glycol that can be blended with PLA and the ethylene ester to obtain a modified PLA polymer composition having a final poly(trimethylene ether) glycol and ethylene ester copolymer content in the desired ranges. However, preblending the PLA with the ethylene ester copolymer (such as EBA) before adding the PO3G may be undesirable.

Modified PHA compositions with PHA polymers other than PLA may be prepared similarly by substituting the desired PHA polymer for the PLA polymer.

Preferably the composition comprises about 60 to 98% by weight of base polymer, about 1 to about 40% by weight of ethylene ester copolymer and about 1 to about 40% by weight of poly(trimethylene ether) glycol and ethylene ester copolymer, and more preferably, about 70 to 98% by weight of base polymer and about 2 to 30% by weight of a combination of polytrimethylene ether glycol and ethylene ester copolymer. Preferably, the ratio of ethylene ester copolymer to PO3G in the composition may be from about 1:5 to about 5:1, more preferably from about 1:2 to about 2:1, or about 1:1.

Of note are methods and compositions as described herein wherein no additional polymeric materials other than the PHA base polymer, poly(trimethylene ether) glycol and ethylene ester copolymer are included.

The compositions may further comprise small amounts of optional materials commonly used and well known in the polymer art. Such materials include conventional additives used in polymeric materials including nucleating agents, stabilizers including viscosity stabilizers, heat stabilizers, and hydrolytic stabilizers, primary and secondary antioxidants such as for example IRGANOX® 1010, ultraviolet ray absorbers and stabilizers, anti-static agents, dyes, pigments or other coloring agents, fire-retardants, lubricants, processing aids, slip additives, antiblock agents such as silica or talc, release agents, water scavengers, pigments and/or mixtures thereof. Other optional additives include inorganic fillers such as talc, calcium carbonate and the like; $TiO_2$, which is used as a whitening agent; optical brighteners; surfactants; and other components known in the polymer art. Many such additives are described in the *Kirk Othmer Encyclopedia of Chemical Technology*, 5$^{th}$ edition, John Wiley & Sons (Hoboken, 2005).

These conventional ingredients may be present in the compositions in quantities that are generally from 0.01 to 15 weight %, preferably from 0.01 to 5 weight % or 0.01 to 10 weight % of the total composition, so long as they do not detract from the basic and novel characteristics of the composition and do not significantly adversely affect the performance of the material prepared from the composition. For applications where high clarity is desirable, some additives, such as fillers or $TiO_2$ may be undesirable. The optional incorporation of such conventional ingredients into the compositions may be carried out by any known process, for example, by dry blending, by extruding a mixture of the various constituents, by the conventional masterbatch technique, or the like.

The compositions may be shaped into articles using any melt-processing technique suitable for PHA.

The compositions may be melt-formed into films by extrusion or calendaring to prepare nearly amorphous cast film. The film may be a single layer of the PHA composition (a monolayer sheet) or a multilayer film or sheet comprising a layer of the PHA composition and at least one additional layer comprising a different material such as a Surlyn® ionomer resin heat seal layer.

For packaging applications, a multilayer film may involve three or more layers including an outermost structural or abuse layer, an inner or interior barrier layer, and an innermost layer making contact with and compatible with the intended contents of the package and capable of forming any needed seals. Other layers may also be present to serve as adhesive layers to help bond these layers together. The thickness of each layer can range from about 10 to about 200 µm.

The outermost structural or abuse layer may be prepared from the PHA composition. Additional structure layers may include amorphous polyester or propylene/ethylene copolymer, but can also include amorphous polyamide (nylon). The structure layer can be printed, for example, by reverse printing using rotogravure methods.

Additional layers may be applied by lamination. The inner layer can include one or more barrier layers to reduce the permeation rate through the layer by agents such as water, oxygen, carbon dioxide, electromagnetic radiation such as ultraviolet radiation, and methanol that potentially can affect the product inside therein. Barrier layers can comprise, for example, metalized polypropylene or polyethylene terephthalate, ethylene vinyl alcohol, polyvinyl alcohol, polyvinylidene chloride, aluminum foil located so as not to interfere with the optical value of the PHA such as to read-through to the print layer, silicon oxides (SiOx), aluminum oxide, aromatic nylon, blends or composites of the same as well as related copolymers thereof.

The innermost layer of the package may be a sealant and can be a polymer layer or coating that can be bonded (sealed) to itself or other film or substrate at temperatures substantially below the melting temperature of the outermost layer. Sealants are well known and can be commercially available from E. I. du Pont de Nemours and Company (DuPont), Wilmington, Del. Substrates can include foil, paper or nonwoven fibrous material.

A multilayer film can be produced by any method well known to one skilled in the art such as, for example, solvent or thermal lamination or plasma deposition. Other suitable converting techniques are, for example, extrusion coating.

Films can be used to prepare packaging materials such as containers, pouches and lidding, balloons, labels, tamper-evident bands, or engineering articles such as filaments, tapes and straps. Although the discussion herein uses the term film, it is also applicable to sheets, which are considered thicker than films, such as about 20 mil.

Those cast films or sheets that are nearly amorphous may be further thermoformed into articles and structures followed by heat treatment. The thermoformed articles can be prepared by any means known to one skilled in the art, for example by heating the amorphous sheet to above the glass transition temperature (Tg) and below the melting point of the plasticized polymer composition, stretching the sheet by vacuum or pressure forming using a mold to provide a stretched article, and cooling the stretched article to provide a finished article. The stretched article may be optionally heat treated to provide greater crystallization.

For example, the compositions may be formed into films or sheets by extrusion through either slot dies and rapidly cooled by contact with metal rolls held at or below Tg to produce a first article including film or sheet or blown film or sheet. The first article can have a surface area to thickness ratio greater than about 100,000:1 inch (254,000:1 cm) or > about 1000:1 inch (2540:1 cm) inch. The article can also have more than about 2%, 5%, or even 15% crystallinity (for example, PLA DSC method quantifies "30% crystallinity" as about 30 J/g melting endotherm minus exotherm for PLA when being heated from amorphous state at a rate of 10° C./minute).

The first film or sheet article can be thermoformed in a mold at a temperature of at least about 90° C., at least about 95° C., at least about 100° C. or at least about 120° C. and may be up to about 140° C., to produce a second article. The second article is held in the heated mold for less than about 40, less than about 20 seconds, less than about 10 seconds, or less than about 5 seconds to produce a thermoformed article.

The mold shape can be any mold known to one skilled in the art such as trays, cup, cap, bowl, or lid. The mold material can be aluminum or ceramic and can be used for stretching (orientation) the heated sheet of PHA to conform the sheet to the shape of the mold. Thermoforming can be facilitated by vacuum-assist (application of vacuum from inside the mold to a heated sheet of PHA covering the top of the mold), pressure-assist (application of pressurized air to the sheet of PHA covering the top of the mold) and/or plug-assist (mechanically pressing the sheet into the mold) techniques.

The thermoformed article can be transferred to another mold that is cool and hardens the article for resistance to deformation during subsequent handling, trimming, and stacking operations. For thick profiles, the cooling rate of the interior of the profile may be benefited by use of the coldest temperature practical on the exterior of the article. That temperature is desirably below the glass transition temperature of the PHA. For example, for PHA having a glass transition temperature of about 55° C. and sheeting thickness of about 700μ may benefit from using one-side quenching temperatures of 20° C. whereas 500-μ sheet can be made using 30° C. one-sided quench conditions. Quench temperatures above about 55° C. may not be as useful because the desired hardness is a result of cooling the article below Tg (55° C. in this case).

In processing the near amorphous semi-finished article into a low haze and crystallized sheet, the amorphous article may be first heated by conductive, convective, or radiative heating. With radiative heating, the article is exposed to black-body radiation temperatures ranging from 200° C. to about 700° C. Time in a 230° C. black body radiator may range from about 10 seconds to about 70 seconds, or from 20 seconds to 60 seconds, or 30 seconds to 50 seconds for a 600μ thick profiles heated from both sides. The optimal temperature for the semi-finished article for achieving crystallinity and clarity in the next step is about half way between the glass transition and the melt point for the particular PHA used. Low temperatures cause the sheet not to fill the mold. Higher temperatures cause sheet collapse before forming into the mold can occur.

In forming the heated amorphous semi finished article into a finished low haze, crystalline article the semi-finished article may be stretched at sufficiently high speeds and high stretch ratios to cause crystallization and to enable those crystallites to be small enough to not cause high haze. X-ray may be used to measure size of the crystallites. For low haze the crystallites size of PLA or PHA desirably is less than about 1000 nm or preferably less than about 100 nm or more preferably less than about 50 nm. Stretch rate may be about 10% to about 1000% per second, or between 20% per second and 500% per second. Stretch ratios may be about 20% (post stretch length is 150% of the pre-stretched dimension) to about 800%, or 50% to 700%, or 100% to 300%. Not wishing to be bound by theory, slow stretch rates may give haze or incompletely formed articles and too high stretch rates may give insufficiently high crystallinity resulting in finished articles which have poor dimensional stability above the glass transition temperature. Low stretch ratios may not induce enough crystallinity within the short time of the thermoforming process or cause haze in the finished article and too high a stretch ratio may cause excessive thinning or tearing of the article. The exact stretch ratio may be higher for unbalanced or one-dimensional stretching or articles which are not cooled during the stretching operation such as is the case for vacuum, pressure-assisted, or no physical "plug assistance". Otherwise those parts of the article that are cooled during the stretch operation may experience haze or poor dimensional stability.

A film or sheet could be thermoformed to produce a concave surface used as a container or packaging material such as a tray, cup, can, bucket, tub, box or bowl. Thermoformed articles may be combined with additional elements, such as a generally planar film sealed to the thermoformed article that serves as a lid (a lidding film).

The article can be in other forms such as shaped articles or molded articles including rods, extruded profiles, fibers and filaments. Any molding process conventional in the plastics forming art including, for example, compression molding, injection molding, extrusion molding, blow molding, extrusion blow molding or biaxial stretching blowing parisons (injection stretch blow molding), melt spinning, profile extrusion and heat molding may be used. Commonly used melt-molding methods known in the art to achieve low haze and crystallinity can include injection molding into a cold mold followed by blow molding, profile extrusion molding with stretching, or extrusion blow molding and followed by heat treatment.

The shaped articles include cartons; squeezable tubes, pouches or bottles; components of containers; bags or pouches within a rigid container that dispense liquids such as wine, medical fluids, baby formula; clam shells, and blister packs.

Products that can be packaged include food and non-food items including beverages (e.g., carbonated beverages, orange juice, apple juice, grape juice, other fruit juices and milk), solid foods (e.g., meats, cheese, fish, poultry, nuts, coffee, applesauce or other sauces, stews, dried fruit, food paste, soups and soup concentrates and other edible items), spices, condiments (e.g., ketchup, mustard, and mayonnaise), pet food, cosmetics, personal care products (e.g., toothpaste, shaving foam, soaps, shampoos, lotions and the like), pharmaceuticals, fragrances, electronic components, industrial chemicals or household chemicals (e.g., laundry detergent, fabric softener), agrochemicals, medical devices and equipment, medicinal liquids, fuels, and biological substances.

The PHA blend compositions can be used in articles other than for packaging such as fibers, films for agricultural mulch, diapers, tape and in paper coating. Films may also be slit into narrow tapes and drawn further to provide slit film fibers for use as degradable sutures.

The invention is further illustrated in the following examples. These examples, while indicating preferred embodiments of the invention, are presented by way of illustration only. From the above discussion and these examples, one skilled in the art can ascertain the essential characteristics of this invention, and without departing from the spirit and scope thereof, can make various changes and modifications of the invention to adapt it to various usages and conditions.

EXAMPLES

Materials Used

PO3G: Poly(trimethylene ether) glycol available as Cerenol™ H1400 polyol from DuPont, Wilmington, Del.

PLA2002D: pellets were purchased from NatureWorks LLC (Minnetonka, Minn. USA) and had a melt viscosity about 1500 Pa-s (190° C. and 100s$^{-1}$), a melt point maximum endotherm at 150° C., and crystallinity generated with a second 10° C./minute heating of pellets previously heated to complete melting at 250° C. and cooled to 20° C. of about 0.5 J/g. PLA2002D is described by the supplier as having a major portion of L-lactide and about 4.3 to 5% "non L-lactide".
Behenamide: Crodamide° BR available from Croda Inc, Edison, N.J.
EBAGMA: an autoclave-produced ethylene/n-butyl acrylate/ glycidyl methacrylate terpolymer (monomer ratio 66.75 wt % ethylene, 28 wt % n-butyl acrylate, 5.25 wt % glycidyl methacrylate), melt index 12 g/10 minute, 190° C., 2.16 kg load as measured by ASTM method D1238, melting range 50° C. to 80° C.
EBA: a tubular-reactor produced ethylene/n-butyl acrylate dipolymer (monomer ratio 73 wt % ethylene, 27 wt % n-butyl acrylate), melt index 4 g/10 minute, 190° C., 2.16 kg load as measured by ASTM method D1238; melting point 94° C.

All parts, percentages, etc., are by weight unless otherwise indicated.

PLA 2002D polymer was dried in a vacuum oven at 90 to 95° C. for around 18 hours prior to melt mixing and was maintained in a moisture-free environment prior to processing. Batch blending of materials was accomplished on a Haake Rheocord 9000 5 blender using roller blade rotors and a 55-g mixing chamber operated by preheating the unit to 210° C., then running rotors, starting the clock, charging a total of about 55 g of ingredients simultaneously (within about a 15 second period) at the weight percentages listed in Table 1, closing the lid, and mixing for 5 minutes with 125 rpm rotor speed. When complete the melt mass was discharged onto a cold container, cooled to ambient temperature and sealed. Example 2a was prepared as described for the other examples, except the EBA was blended first with the PLA and then PO3G was added and blended.

The compositions prepared are summarized in Table 1 and analyzed within 2 days.

TABLE 1

| | Weight % | | | | |
|---|---|---|---|---|---|
| Example | PLA2002 | PO3G | behenamide | EBAGMA | EBA |
| C1 | 100 | 0 | 0 | 0 | 0 |
| C2 | 96 | 4 | 0 | 0 | 0 |
| C3 | 90 | 10 | 0 | 0 | 0 |
| C4 | 95 | 0 | 0 | 5 | 0 |
| 1 | 96 | 2 | 0 | 2 | 0 |
| 2 | 96 | 2 | 0 | 0 | 2 |
| 2a | 96 | 2 | 0 | 0 | 2 |
| C5 | 96 | 0 | 4 | 0 | 0 |
| C6 | 96 | 0 | 2 | 2 | 0 |

Differential Scanning calorimetry (DSC) was used to determine glass transition temperature (Tg), temperature of crystallization from the glass or cold crystallization (Tc) and melting point (Tm). A sample (4-9 mg) of polymer was analyzed using a TA Instruments (New Castle, Del.) 15 Model Q1000 for heating from room temperature to 250° C. using a heating rate of 10° C./min, then cooling the sample to ambient or about 20° C. at 10° C./min and then reheated at 10° C./min to 250° C.

The first heating cycle was used to eliminate any crystallinity in the sample that may have formed during preparation or storage. The second heating generates a crystallization exotherm when the polymer crystallizes at Tc and at higher temperatures an endotherm is generated when the polymer crystals melt at Tm. The results observed in the second heat-up are summarized in Table 2. The "J/g" for the endotherm minus the "J/g" for the exotherm is an approximate measure of the amount of crystallinity created in the sample during its cooling down and is expressed in "J/g". One hundred J/g may indicate approximately 100% crystalline PLA, based on descriptions in R. E. Drumright et al, *Advanced Materials* 2000 12, (23), p. 1841 and Z. Kulinski, et al, *Polymer* 2005, 46, pp. 10290-10300). Lower amounts of J/g indicate less crystallinity, with the value of J/g roughly proportional to the % crystallinity.

TABLE 2

| Example | Tg (° C.) | cold crystallization Tc (° C.) | cold crystallization exotherm (J/g) | melting endotherm (J/g) |
|---|---|---|---|---|
| C1 | 59 | amorphous | 0 | 0.5 |
| C2 | 58 | 130 | 3.8 | 3.9 |
| C3 | 51 | 124 | 11 | |
| C4 | 58 | amorphous | 0 | 0 |
| 1 | 54 | 95 | 22 | 26 |
| 2 | 58 | 123 | | 36 |
| 2a | 60 | amorphous | 0 | 0 |
| C5 | 58 | 98 | 21 | 25 |
| C6 | 58 | 102 | 25 | 30 |

As shown in Table 2, neat PLA2002D has a glass transition temperature (Tg) of about 59° C. and remains amorphous on heating until its melting temperature (The melting points are about 150° C. for all the runs summarized in Table 2). Addition of PO3G provides compositions that exhibit some crystallinity. As the amount of PO3G in PLA increases from 0 to 10 weight % (Comparative Examples $C_1$-$C_3$), the glass transition temperature (Tg) decreased. This result indicates that PO3G functions as a true plasticizer.

Modifying PLA2002D with EBAGMA had little effect on the thermal performance (Comparative Example C4). The Tg, Tm and amount of crystallinity were essentially unchanged from C1.

Surprisingly, when PLA was modified with a combination of PO3G and EBAGMA (Example 1), the composition had significantly lower heat-up crystallization temperature (95° C.) and greater crystallinity than PLA modified with either PO3G or EBAGMA individually. This result is unexpected since neither PO3G nor EBAGMA provide significant nucleation to PLA when used separately.

These results compare favorably to compositions prepared using a known nucleator behenamide, illustrated in Comparative Examples C5 and C6. Example 1 (PLA modified with PO3G and EBAGMA had 10° C. lower heat-up crystallization temperature, about 5 J/g lower resulting crystallinity and 5° C. lower Tg compared to C6.

Example 2 shows that use of EBA and PO3G also provides cold crystallization when the combination is mixed with the PLA simultaneously. Blending EBA with PLA and then blending in PO3G (Example 2a) does not provide the same benefit.

Samples of Comparative Examples C2 and C4, and Example 1 were pressed into 10 mil thick sheets at 235° C. and rapidly quenched to provide amorphous sheets using the following procedure. The test composition was sandwiched between two KAPTON® polyimide films and preheated for about one minute at 235° C. Pressure was applied to the film sandwich, rising to about 10,000 psi over about 15 seconds and then held at that temperature and pressure for about one minute. The pressure was released and the films were immediately transferred to a second press held at 22° C. and pressed again at about 10,000 psi for one minute. After pressure was released, the polyimide films were easily removed from the sheets.

Four sheets of each composition were prepared. Two sheets of each composition were annealed at 105° C. 4 hours in the absence of oxygen. The tensile properties for the annealed samples were tested.

Each annealed sheet was die cut into dogbone microtensile bars and tested according to ASTM D-638. Elongation to break was determined by Instron pull of the dogbone at 1 inch/minute at ambient conditions (about 25° C.) and reported in Table 3.

TABLE 3

| | Example | | | |
|---|---|---|---|---|
| | C2 | C1* | C4 | 1 |
| Elongation at break (%) | 8 | 2 | 28 | 17 |

*tested previously using similar conditions (see US2009/0069509)

A qualitative brittleness test was conducted on each composition. Strips about 0.25 inches wide were cut from each sheet. A dead-end test was performed using pliers to rapidly (in less than one second) bend each sample back on itself This type of test is a useful indicator for the behavior of a composition in flexing and bending such as in the joint or hinge area of a thermoformed clamshell package. Annealed and non-annealed strips prepared from Comparative Example C2 broke, while annealed and non-annealed strips prepared from Comparative Example C4 and Example 1 did not. This test shows significantly less brittleness for PLA compositions containing both PO3G and EBAGMA than for a PLA composition modified only with PO3G.

In summary, PHA compositions modified with both a PO3G plasticizer and ethylene ester copolymer such as EBAGMA exhibited an unexpected combination of fast cold crystallization and toughness.

The invention claimed is:

1. A polymer composition, comprising a blend of a poly (hydroxyalkanoic acid), an ethylene ester copolymer, and poly(trimethylene ether) glycol wherein, based on the total weight of the composition,
   the poly(hydroxyalkanoic acid) is present in the composition from about 50 to 99.8%;
   the poly(hydroxyalkanoic acid) comprises polymerized units of one or more hydroxyalkanoic acids selected from the group consisting of 6-hydroxyhexanoic acid, 3-hydroxyhexanoic acid, 4-hydroxyhexanoic acid, 3-hydroxyheptanoic acid, glycolic acid, lactic acid, 3-hydroxypropionic acid, 2-hydroxybutyric acid, 3-hydroxybutyric acid, 4-hydroxybutyric acid, 3-hydroxyvaleric acid, 4-hydroxyvaleric acid, 5-hydroxyvaleric acid, and combinations of two or more thereof;
   the ethylene ester copolymer is present in the composition from about 0.1 to about 40% and comprises, based on the total weight of the ethylene ester copolymer, (a) about 30 to about 99.5 weight % of copolymerized units of ethylene, (b) 0 to about 25 weight % of copolymerized units of at least one ester of the formula $CH_2=C(R^1)CO_2R^2$, and (c) 0 to about 70 weight % of copolymerized units of at least one ester of the formula $CH_2=C(R^3)CO_2R^4$; provided that the amounts of (b) and (c) in the copolymer are not both 0;
   $R^1$ is hydrogen or an alkyl group having 1-6 carbon atoms; $R^2$ is a glycidyl group; $R^3$ is hydrogen or an alkyl group having 1 to 8 carbon atoms; and $R^4$ is an alkyl group having 1 to 8 carbon atoms; and
   the poly(trimethylene ether) glycol is present in the composition from about 0.1 to about 40% and has a hydroxyl number from 20 to 840.

2. The composition of claim 1 wherein the poly(hydroxyalkanoic acid) is selected from the group consisting of poly (glycolic acid), poly(lactic acid), poly(hydroxybutyric acid), poly(hydroxybutyric acid-hydroxyvaleric acid) copolymer, poly(glycolic acid-lactic acid) copolymer, and combinations of two or more thereof.

3. The composition of claim 2 wherein the poly(hydroxyalkanoic acid) is poly(lactic acid), and optionally, a stereo complex of poly(D-lactic acid) and poly(L-lactic acid).

4. The composition of claim 1 wherein the ethylene ester copolymer comprises 0.5 to about 25 weight % of copolymerized units of $CH_2=C(R^1)CO_2R^2$ and 0 weight % of copolymerized units of $CH_2=C(R^3)CO_2R^4$.

5. The composition of claim 1 wherein the ethylene ester copolymer comprises of 0 weight % of copolymerized units of $CH_2=C(R^1)CO_2R^2$ and 0.5 to about 70 weight % of copolymerized units of $CH_2=C(R^3)CO_2R^4$.

6. The composition of claim 1 wherein the ethylene ester copolymer comprises 0.5 to about 25 weight % of copolymerized units of $CH_2=C(R^1)CO_2R^2$ and 0.5 to about 70 weight % of copolymerized units of $CH_2=C(R^3)CO_2R^4$.

7. The composition of claim 3 wherein the ethylene ester copolymer comprises about 40 to about 94% of copolymerized units of ethylene, about 3 to about 20% of copolymerized units of $CH_2=C(R^1)CO_2R^2$, and about 3 to about 70% of copolymerized units of $CH_2=C(R^3)CO_2R^4$.

8. The composition of claim 7 wherein the ethylene ester copolymer comprises about 3 to about 17% of $CH_2=C(R^1)CO_2R^2$, and about 20 to about 35% of $CH_2=C(R^3)CO_2R^4$.

9. The composition of claim 3 wherein the ethylene ester copolymer is selected from the group consisting of ethylene glycidyl methacrylate dipolymer, ethylene butyl acrylate glycidyl methacrylate terpolymer, ethylene butyl acrylate dipolymer and combinations thereof.

10. The composition of claim 8 wherein the ethylene ester copolymer is an ethylene butyl acrylate glycidyl methacrylate terpolymer.

11. A process comprising:
   (1) physically blending, based on the total weight of the resulting blend, about 50 to 99.8 weight % of a poly (hydroxyalkanoic acid) polymer, about 0.1 to about 40 weight % of an ethylene ester copolymer, and about 0.1 to about 40% by weight of poly(trimethylene ether) glycol;
   (2) melt processing the poly(hydroxyalkanoic acid), ethylene ester copolymer, and poly(trimethylene ether) glycol at a temperature 20 to 40° C. higher than the melt temperature of the poly(hydroxyalkanoic acid) to form a mixture;
   (3) cooling the mixture to produce a plasticized polymer composition; and
   (4) optionally grinding the plasticized polymer composition; wherein
   the poly(hydroxyalkanoic acid) comprises polymerized units of one or more hydroxyalkanoic acids selected from the group consisting of 6-hydroxyhexanoic acid, 3-hydroxyhexanoic acid, 4-hydroxyhexanoic acid, 3-hydroxyheptanoic acid, glycolic acid, lactic acid, 3-hydroxypropionic acid, 2-hydroxybutyric acid, 3-hydroxybutyric acid, 4-hydroxybutyric acid, 3-hydroxyvaleric acid, 4-hydroxyvaleric acid, 5-hydroxyvaleric acid, and combinations of two or more thereof;

the ethylene ester copolymer comprises, based on the total weight of the ethylene ester copolymer, (a) about 20 to about 95 weight % of copolymerized units of ethylene, (b) 0 to about 25 weight % of copolymerized units of at least one ester of the formula $CH_2=C(R^1)CO_2R^2$, and (c) 0 to about 70 weight % of copolymerized units of at least one ester of the formula $CH_2=C(R^3)CO_2R^4$; $R^1$ is hydrogen or an alkyl group having 1-6 carbon atoms, $R^2$ is a glycidyl group, $R^3$ is hydrogen or an alkyl group having 1 to 8 carbon atoms, and $R^4$ is an alkyl group having 1 to 8 carbon atoms; provided that the amounts of (b) and (c) in the copolymer are not both 0; and the polytrimethylene ether glycol has a hydroxyl number ranging from 20 to 840.

12. The process of claim 11 wherein the ethylene ester copolymer and the poly(trimethylene ether) glycol are added simultaneously to the poly(hydroxyalkanoic acid).

13. The process of claim 11 further comprising extrusion molding or press molding the plasticized polymer composition.

14. The process of claim 13 wherein the extrusion molding comprises forming an amorphous film or sheet.

15. The process of claim 14 further comprising heating the amorphous film or sheet to above the glass transition temperature (Tg) and below the melting point of the plasticized polymer composition; stretching the film or sheet by vacuum or pressure forming using a mold to provide a stretched article; and cooling the stretched article to provide a finished article.

16. An article comprising the composition of claim 1.

17. The article of claim 16 wherein the poly(hydroxyalkanoic acid) is poly(lactic acid).

18. The article of claim 17 wherein the article is an amorphous film or sheet.

19. The article of claim 17 wherein the article is thermoformed.

20. The article of claim 17 wherein the ethylene ester copolymer comprises 0.5 to about 25 weight % of $CH_2=C(R^1)CO_2R^2$ and either 0 weight % or 0.5 to about 70 weight % of $CH_2=C(R^3)CO_2R^4$.

21. The article of claim 17 wherein the ethylene ester copolymer comprises 0.5 to about 25 weight % of $CH_2=C(R^1)CO_2R^2$ and 0.5 to about 70 weight % of $CH_2=C(R^3)CO_2R^4$.

22. The article of claim 17 wherein the ethylene ester copolymer comprises about 40 to about 96% of copolymerized units of ethylene, about 3 to about 20% of copolymerized units of $CH_2=C(R^1)CO_2R^2$, and about 3 to about 70% of copolymerized units of $CH_2=C(R^3)CO_2R^4$.

* * * * *